US012065955B2

(12) United States Patent
Hitchings et al.

(10) Patent No.: US 12,065,955 B2
(45) Date of Patent: Aug. 20, 2024

(54) FLOW MANAGEMENT DEVICE

(71) Applicant: Ford Global Technologies, LLC, Dearborn, MI (US)

(72) Inventors: Andrew Hitchings, Cardiff (GB); Paul Nigel Turner, Chelmsford (GB); Sean Gordon Harman, Southend on Sea (GB); Daniel Wilden, Benfleet (GB)

(73) Assignee: Ford Global Technologies, LLC, Dearborn, MI (US)

( * ) Notice: Subject to any disclaimer, the term of this patent is extended or adjusted under 35 U.S.C. 154(b) by 84 days.

(21) Appl. No.: 17/892,861

(22) Filed: Aug. 22, 2022

(65) Prior Publication Data

US 2024/0060442 A1 Feb. 22, 2024

(51) Int. Cl.
*F01N 13/08* (2010.01)

(52) U.S. Cl.
CPC .......... *F01N 13/08* (2013.01); *F01N 2240/20* (2013.01); *F01N 2340/00* (2013.01); *F01N 2470/10* (2013.01)

(58) Field of Classification Search
CPC .. F01N 13/08; F01N 2240/20; F01N 2340/00; F01N 2470/10; F04F 5/00; F04F 5/463–465

USPC .......................................................... 60/629
See application file for complete search history.

(56) References Cited

U.S. PATENT DOCUMENTS

| 2,486,649 | A | * | 11/1949 | Heath | ...................... F04F 5/464 |
| | | | | | 417/182 |
| 8,051,637 | B2 | | 11/2011 | Labrador | |
| 2021/0239022 | A1 | * | 8/2021 | De Rudder | ............... F01N 3/36 |

FOREIGN PATENT DOCUMENTS

| EP | 2823880 B1 | 4/2016 |
| JP | 5349675 B2 | 8/2013 |

* cited by examiner

*Primary Examiner* — Kenneth J Hansen
*Assistant Examiner* — Kelsey L Stanek
(74) *Attorney, Agent, or Firm* — Haley Guiliano LLP

(57) ABSTRACT

A flow management device comprises an outer chamber with an inlet arranged to receive a flow in a first flow direction and an outlet arranged to provide the flow in a second flow direction different from the first direction, and a duct arranged within the chamber, the duct having a first end configured to receive the flow from the inlet and a second end configured to release the flow towards the outlet, wherein a cross-sectional area of the duct increases towards each of the first and second ends of the duct.

15 Claims, 10 Drawing Sheets

Fig. 7
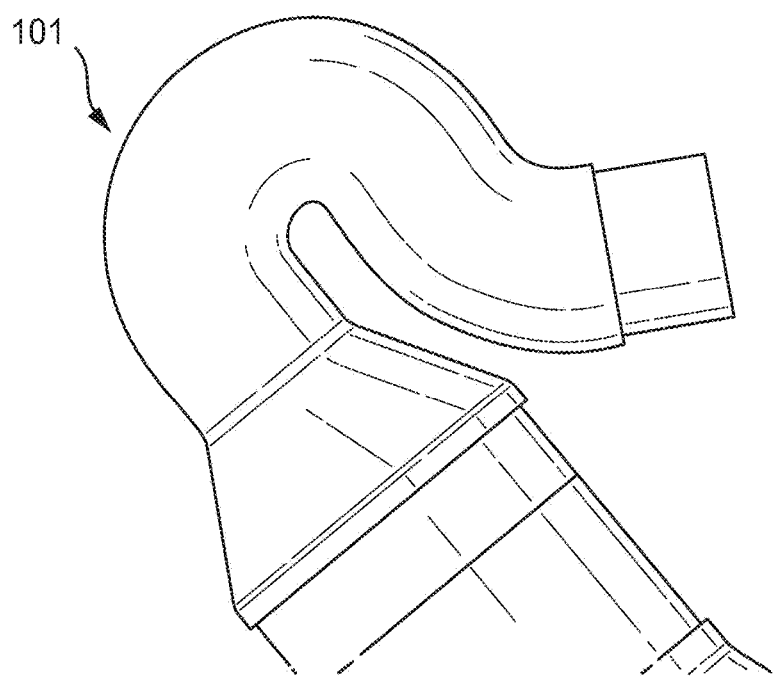
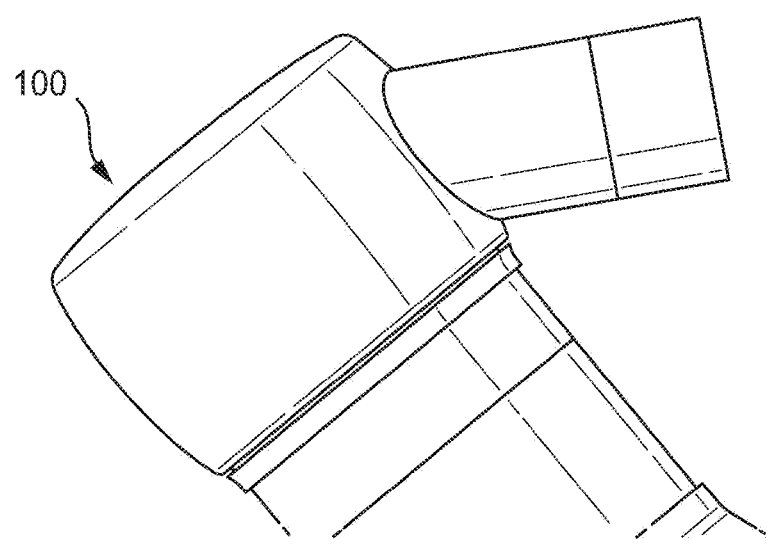

Fig. 8A
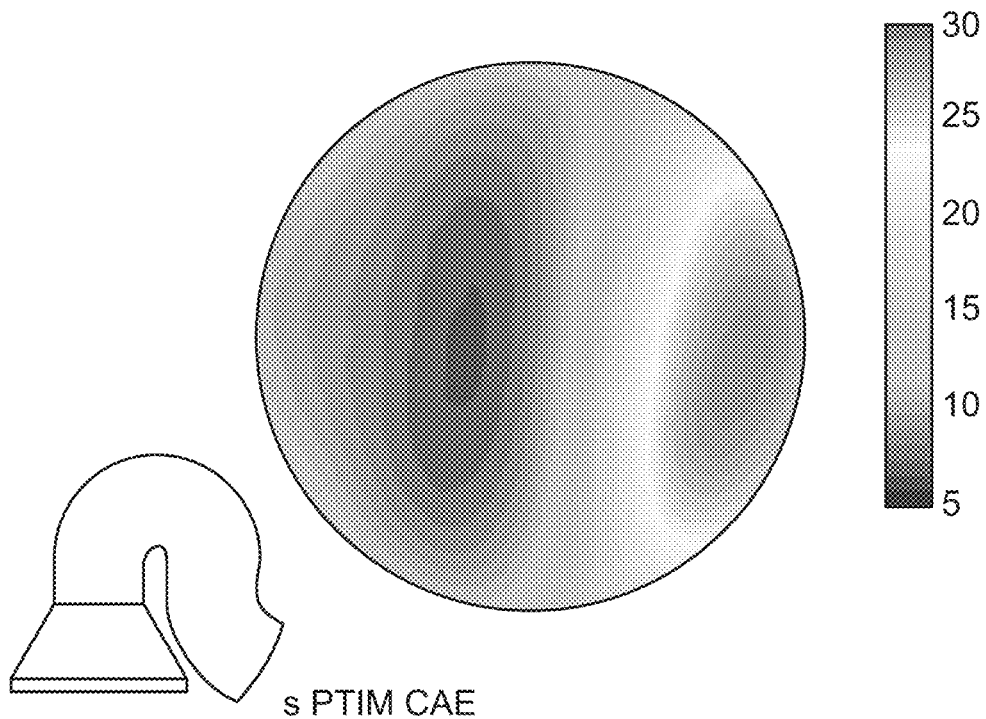
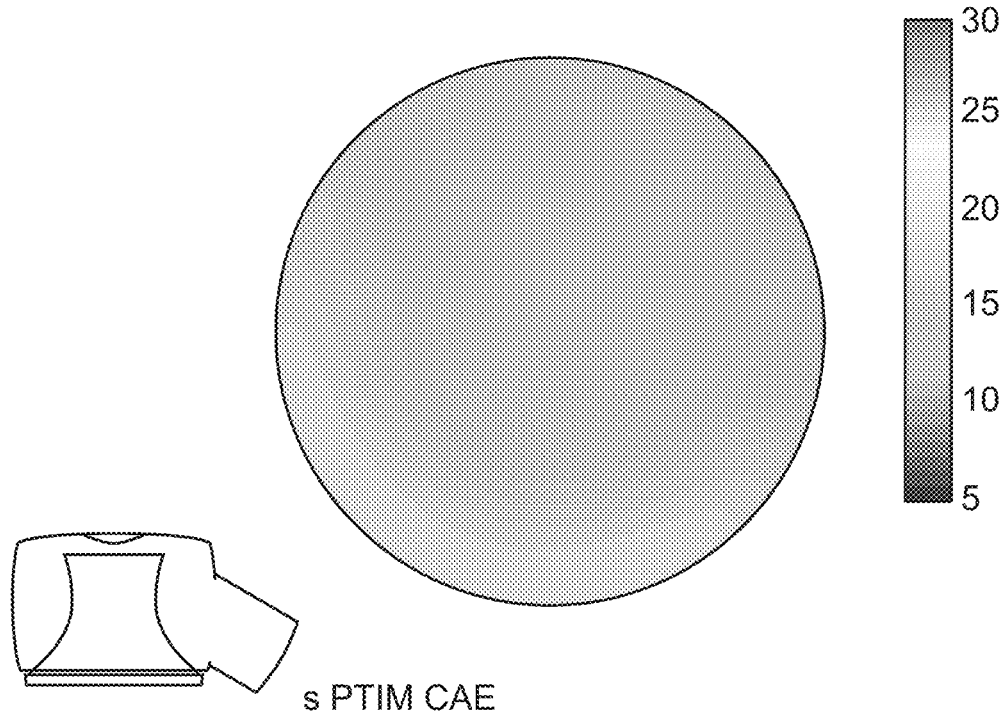

Fig. 8B
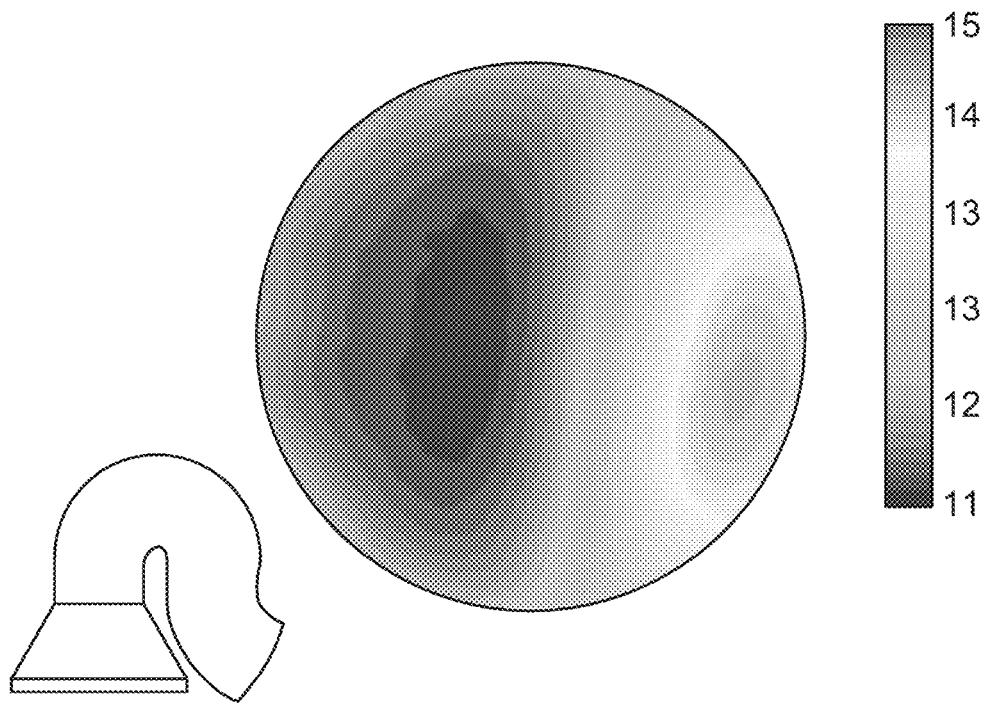
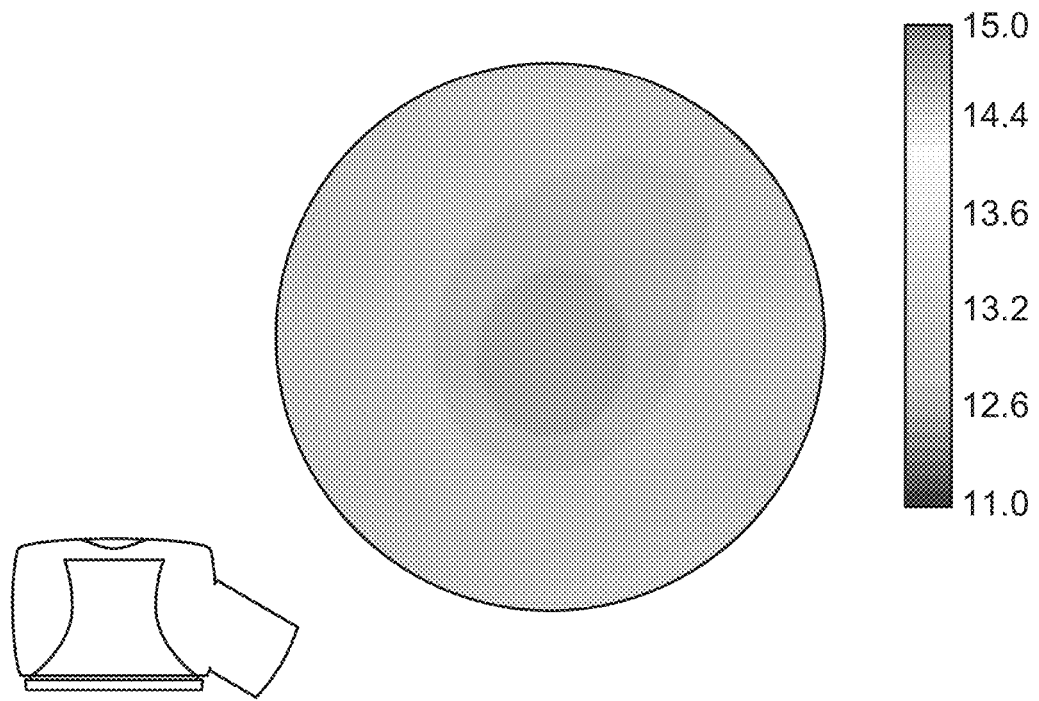

Fig. 8C
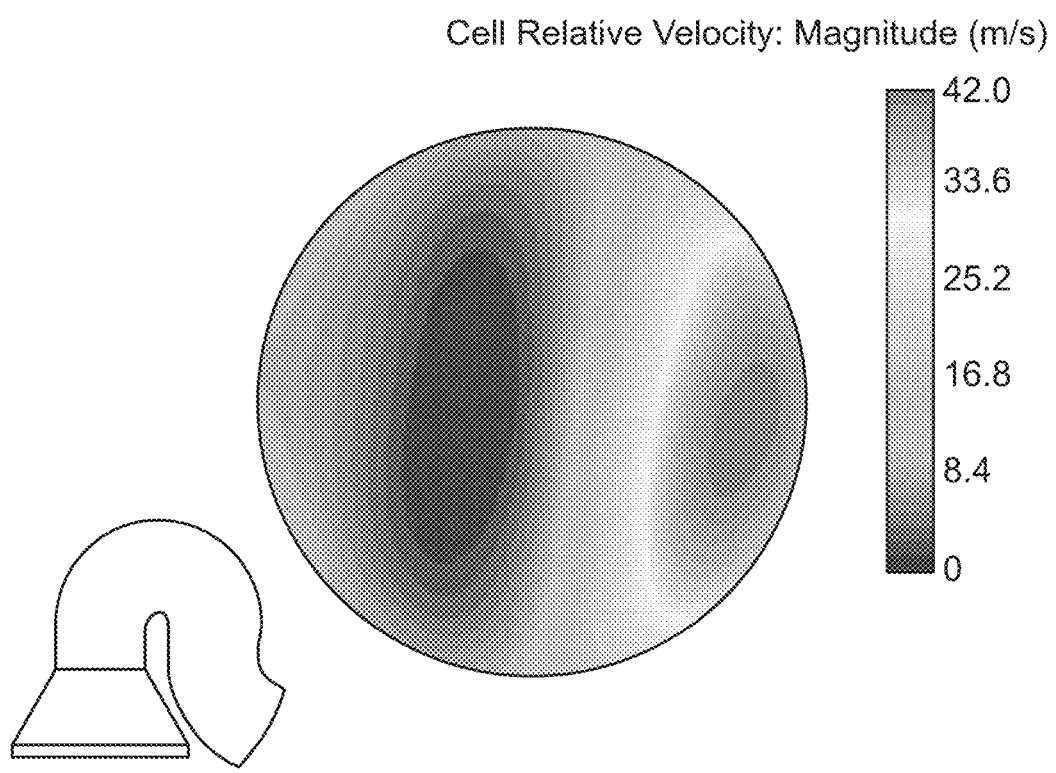
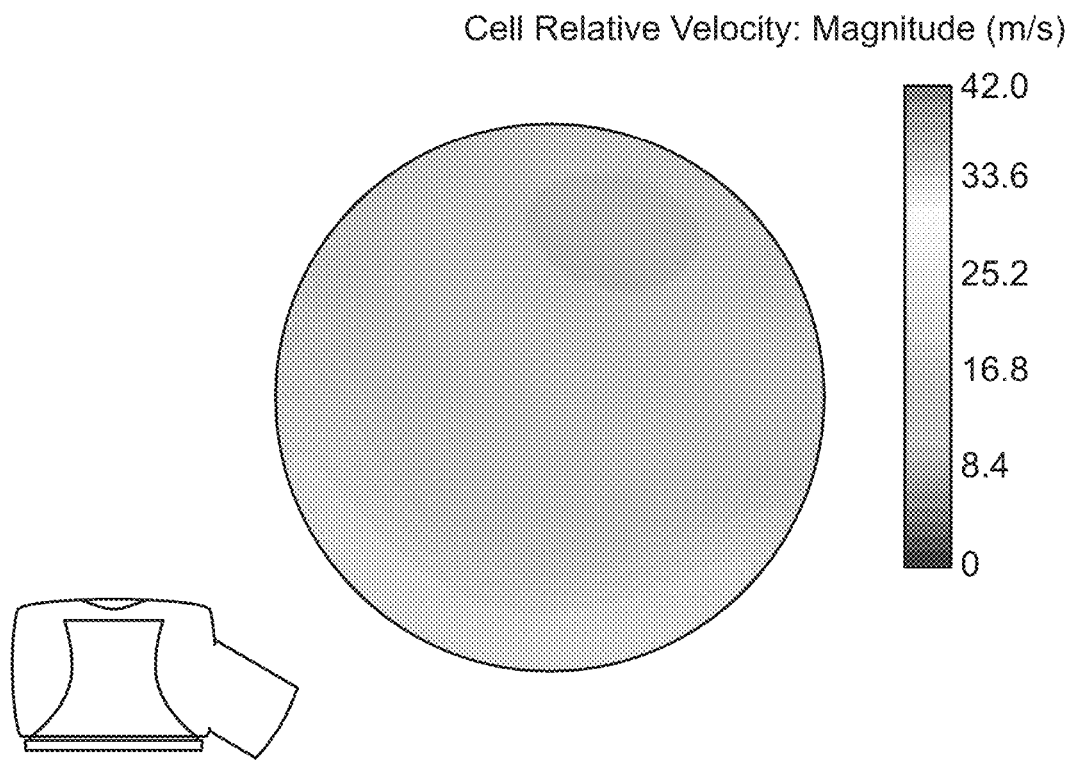

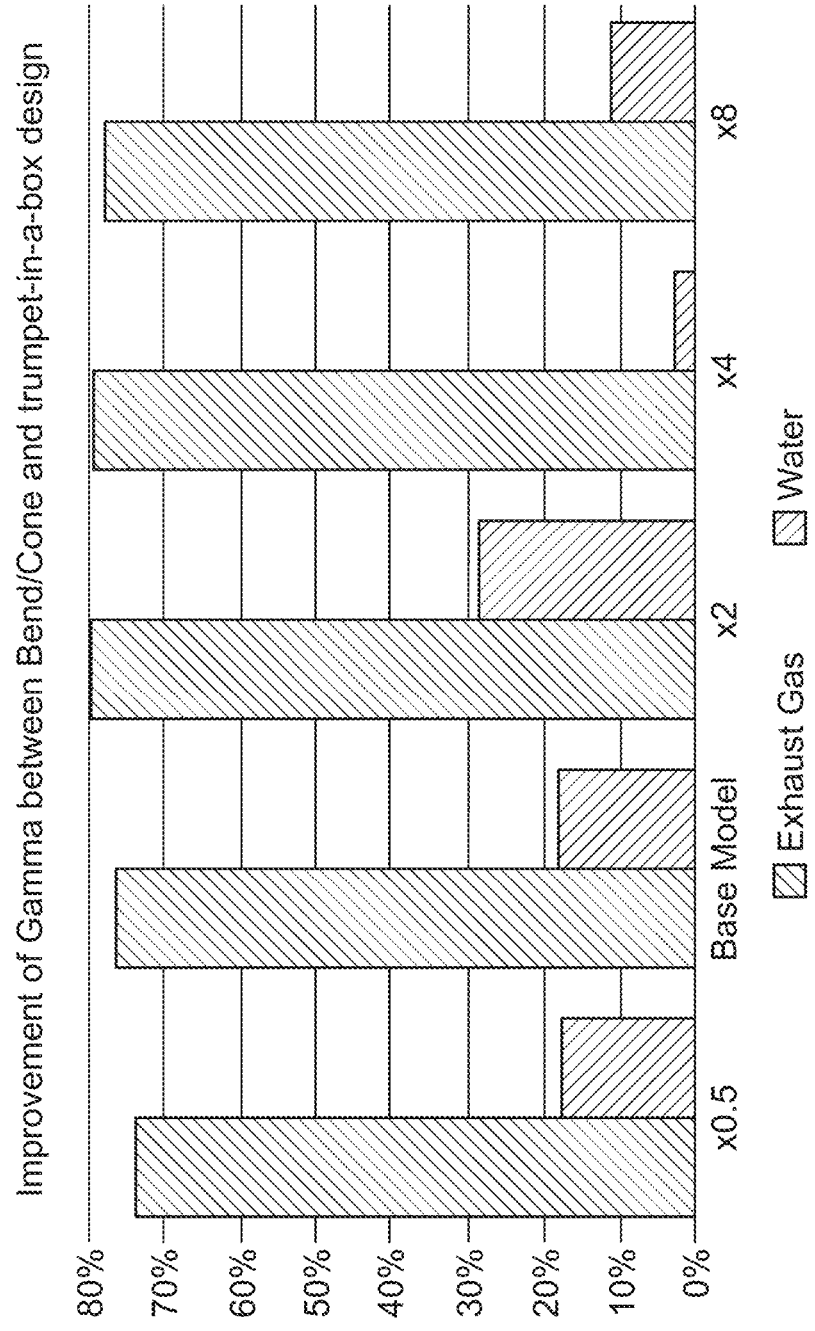

FLOW MANAGEMENT DEVICE

BACKGROUND

The present disclosure relates to the devices and systems for the management of gas or liquid flows. More particularly, but not exclusively, the present disclosure relates to a vehicle flow management for receiving a flow in a first flow direction from a turbo charger and providing the flow in a second flow direction towards an aftertreatment component.

SUMMARY

Systems involving flows of gases and/or liquids often have rigorous packaging requirements or space limitations. In many cases, it is necessary to change the direction of a flow from a first direction to a different second direction, in order to satisfy such requirements. However, changing the direction of a flow can disrupt the flow, in particular if the change in angle of direction is too great. For example, turning a flow through a large angle can result in a "jetting" effect, where the flow is no longer evenly distributed.

In particular, in many vehicles there is a small amount of space between an exhaust manifold (or the outlet of a turbocharger/supercharger) and an aftertreatment component, such as a catalytic converter. In some cases, a catalytic converter having a conventional entry flow may lead to an uneven flow through a catalyst brick of the catalytic converter, e.g., where space at the inlet of the catalytic converter is limited. For example, the flow can "jet" down one side of the catalyst brick, leaving channels of the catalyst brick with low flow or no flow, in some operating conditions.

In order to perform efficiently, it is desirable for the flow through a catalytic converter to be as even as possible. It would therefore be beneficial to manage the flow into the catalytic converter, or any other appropriate component, to be as even as possible.

According to some aspects of the present disclosure, systems and devices are provided that include an outer chamber, e.g., housing, having an inlet arranged to receive a flow, e.g., from a first component, in a first flow direction and an outlet arranged to provide the flow, e.g., to a second component, in a second flow direction different from the first direction. A duct is arranged within the chamber. The duct has a first end configured to receive the flow from the inlet and a second end configured to release the flow towards the outlet. A cross-sectional area of the duct, e.g., of the flow through the duct, increases towards each of the first and second ends of the duct.

In some examples, an edge defining the second end of the duct is radially joined, at least partially, to an inner surface of the outer chamber.

In some examples, a first angle between the first flow direction and the second flow direction is greater than 90 degrees, e.g., in a longitudinal plane of the outer chamber.

In some examples, a second angle between the first flow direction and a line intersecting the inlet and a central axis of the duct is between 0 and 30 degrees, e.g., in a transverse plane of the outer chamber.

In some examples, the smallest cross-sectional area of the duct, e.g., in a transverse plane of the outer chamber, is substantially the same as a cross-sectional area of the inlet.

In some examples, a cross-sectional area at the first end of the duct, e.g., in a first transverse plane of the outer chamber, is less than a cross-sectional-area at the second end of the duct, e.g., in a second transverse plane of the outer chamber.

In some examples, a flow path bounded by the first end of the duct and an inner wall of the outer chamber has a minimum area which is substantially the same as a cross-sectional area of the inlet.

In some examples, the duct is at least a partial hyperboloid, e.g., in axial cross section.

In some examples, the first end of the duct is spaced apart from the inlet of the outer chamber. In some examples, the second end of the duct is spaced apart from the outlet of the outer chamber.

In some examples, a secondary duct is arranged at least partially within the duct.

In some examples, an interior of the duct and/or the secondary duct comprises one or more fins and/or one or more perforations.

In some examples, a secondary inlet is arranged substantially opposite the first inlet on the outer chamber.

In some examples, a secondary inlet is arranged substantially in line with the duct.

In some examples, the outer chamber is substantially cylindrical.

In some examples, the duct is coaxial with the outer chamber, e.g., a longitudinal axis of the duct is coaxial with a longitudinal axis of the outer chamber. In some examples, the duct is axially offset from the outer chamber, e.g., a longitudinal axis of the duct is parallel with and offset from a longitudinal axis of the outer chamber.

In some examples, a cross-sectional area of the outlet is larger than a cross-sectional area of the inlet.

In some examples, the first end of the duct is curved radially outwards and back towards the second end in an axial direction.

In some examples, the first end of the duct comprises an edge, thereby defining an entry plane into the duct. The entry plane may be angled, e.g., inclined, with respect to a longitudinal axis of the duct. The entry plane may be perpendicular to a longitudinal axis of the duct.

According to one aspect of the present disclosure, a flow management device is provided. The flow management device comprises an outer chamber and a duct arranged within the chamber. The outer chamber comprises an inlet arranged to receive a flow in a first flow direction, and an outlet arranged to provide the flow in a second flow direction different from the first direction. The duct has a first end configured to receive the flow from the inlet and a second end configured to release the flow towards the outlet, wherein a cross-sectional area of the duct increases towards each of the first and second ends of the duct.

According to one aspect of the present disclosure, a forced induction system, e.g., a turbocharger system, for a vehicle is provided. The forced induction system comprises a forced induction device, a flow management device and a catalytic converter. The flow management device comprises an outer chamber and a duct arranged within the chamber. The outer chamber comprises an inlet arranged to receive a flow from the forced induction device in a first flow direction, and an outlet arranged to provide the flow to the catalytic converter in a second flow direction different from the first direction. The inlet is connected with the forced induction device, and the catalytic converter is connected with the outlet. The duct has a first end configured to receive the flow from the inlet and a second end configured to release the flow towards the outlet, wherein a cross-sectional area of the duct increases towards each of the first and second ends of the duct.

According to one aspect of the present disclosure, a vehicle comprising the above forced induction system is provided.

It shall be appreciated that other features, aspects and variations of the present disclosure will be apparent from the disclosure of the drawings and detailed description. Additionally, it will be further appreciated that additional or alternative examples of methods of and systems for controlling an electrical accessory may be implemented within the principles set out by the present disclosure.

FIGURES

The above and other objects and advantages of the disclosure will be apparent upon consideration of the following detailed description, taken in conjunction with the accompanying drawings, in which:

FIG. 7 illustrates a comparison between a conventional flow management device and a flow management device, in accordance with some examples of the disclosure.

FIG. 8A shows a plot of flow velocity distribution for a conventional flow management device and a flow management device, in accordance with some examples of the disclosure.

FIG. 8B shows a plot of flow velocity distribution for a conventional flow management device and a flow management device, in accordance with some examples of the disclosure.

FIG. 8C shows a plot of flow velocity distribution for a conventional flow management device and a flow management device, in accordance with some examples of the disclosure.

FIG. 9 shows a chart illustrating improvements in a flow distribution index for a flow management device, in accordance with some examples of the disclosure, over a conventional flow management device.

The figures herein depict various examples of the disclosed disclosure for purposes of illustration only. It shall be appreciated that additional or alternative structures, systems and methods may be implemented within the principles set out by the present disclosure.

DETAILED DESCRIPTION

Figure 1:
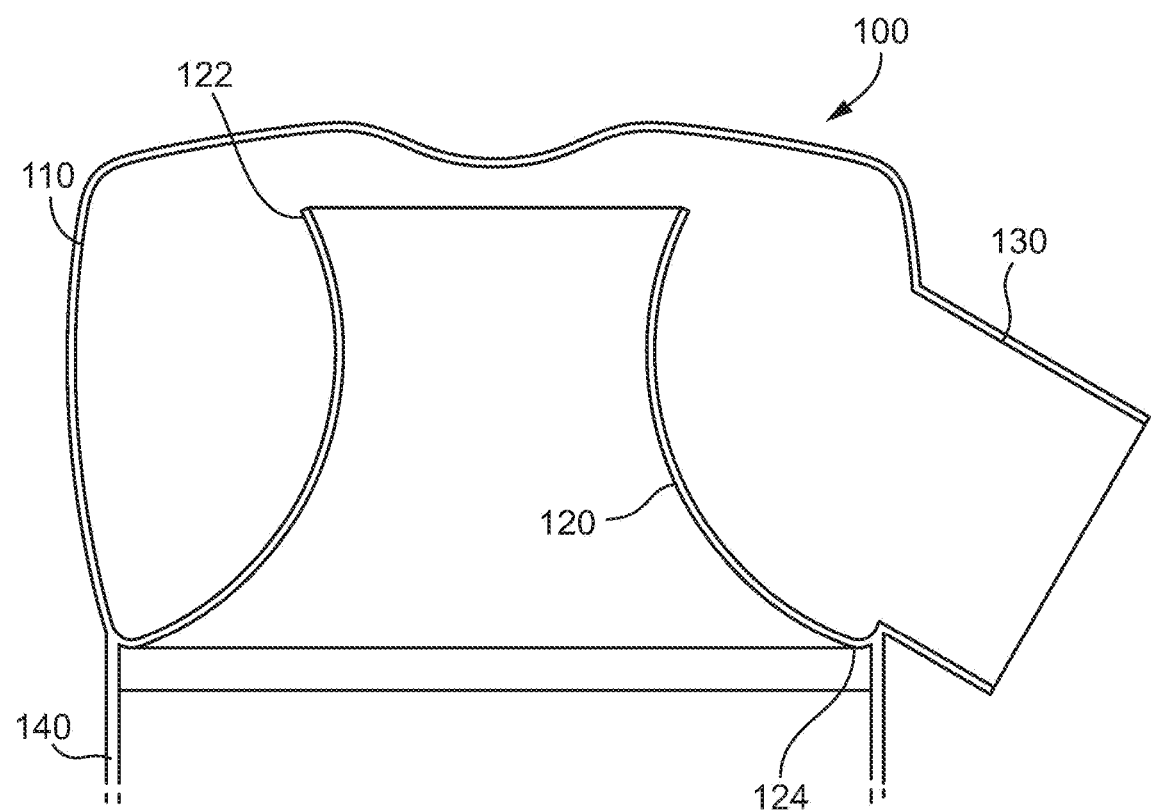
FIG. 1 illustrates an exemplary cross section of a flow management device, in accordance with some examples of the disclosure.

FIG. 1 shows a cross section view of a flow management device 100, in accordance with some examples of the disclosure. The flow management device 100 comprises an outer chamber 110 and a duct 120 arranged within the chamber.

The outer chamber 110 comprises an inlet 130 and an outlet 140. The inlet 130 is arranged to receive a flow in a first flow direction, e.g., in a first average or global flow direction though the inlet. The received flow may be a liquid or a gas. For example, the received flow may include gases received from a preceding stage in an air flow system of a vehicle, e.g., gasses received from an engine, a turbocharger, a supercharger, and/or any other appropriate gas flow component.

In some examples, the outer chamber 110 may be approximately or substantially cylindrical. In this way, the received flow can easily circulate around the outer chamber 110. In some examples, the outer chamber 110 may have a curved outer surface, e.g., in one or more planes. A cross-sectional area, e.g., a transverse cross-sectional area, of the outer chamber 110 may decrease towards each end of the outer chamber 110, e.g., along a curved path or profile. An upper and/or lower face of the outer chamber 110 may be curved, e.g., may have a concave, convex or mixed curvature profile. In some examples, the outer chamber 110 may have a circular cross-section. Alternatively, in some examples, a cross-section, e.g., a transverse cross-section, of the outer chamber 110 may be elliptical or oval. In the context of the present disclosure, the terms "upper" and "lower" are used in the context of the orientation shown in the figures and are not intended to be limited to such an orientation in use.

The outlet 140 is arranged to provide the flow in a second flow direction, e.g., in a second average or global flow direction though the outlet. The second direction is different from the first direction. In this way, the flow management device 100 can provide a change in the flow direction. The flow from outlet 140 may be provided, for example, to a subsequent stage in the air flow system of the vehicle, e.g., to a catalytic converter or catalyst brick. While the example described in detail below focuses on redirecting flow from a turbocharger outlet to a catalyst brick, e.g., where packaging requirements impose tight constraints, the benefits of the systems disclosed herein may be seen in any appropriate system requiring flow to undergo a change in direction in a confined space, whether the flow be liquid or gas.

Figure 2:
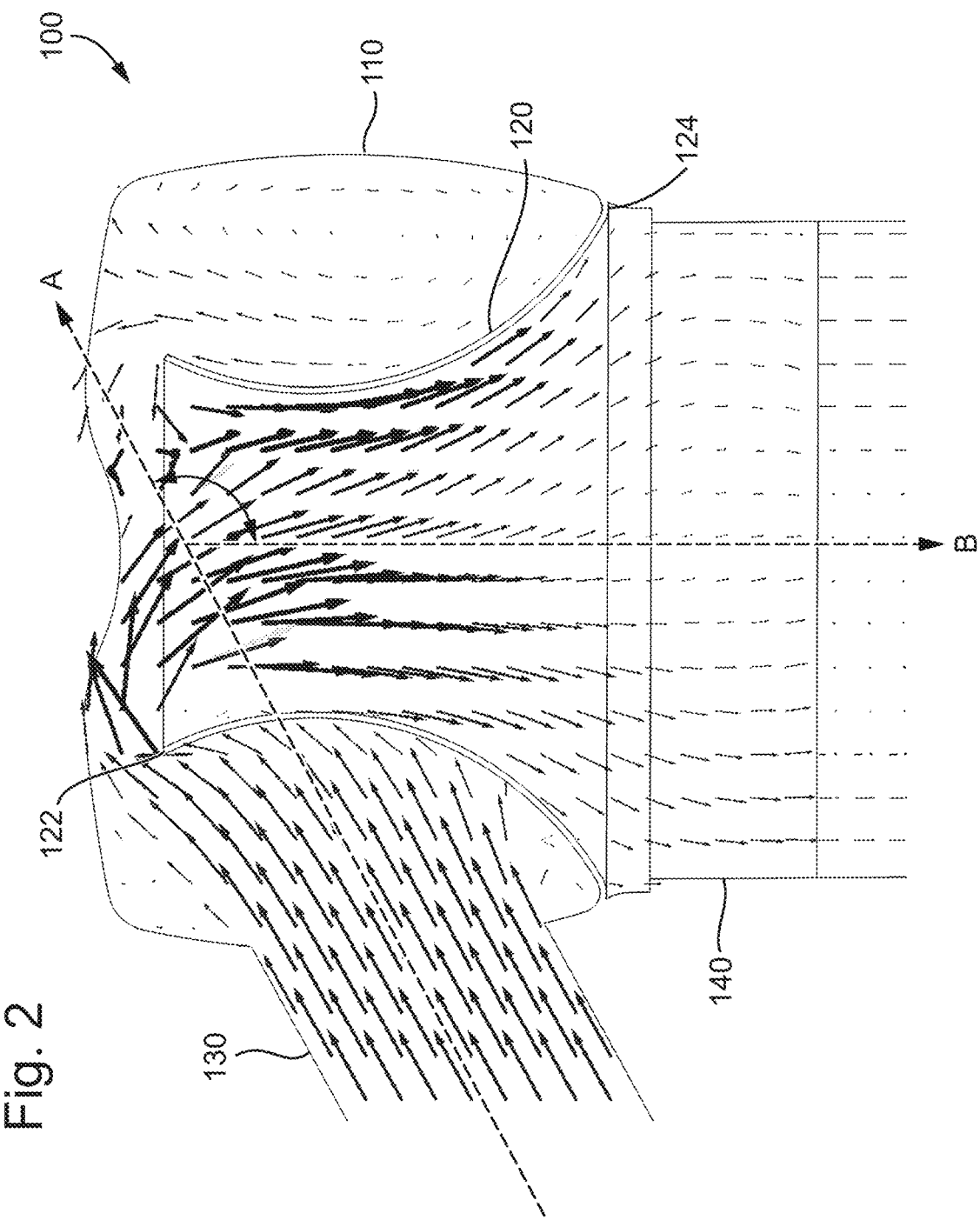
FIG. 2 illustrates an exemplary velocity vector map for a flow management device, in accordance with some examples of the disclosure.

FIG. 2 shows velocity vector map for the flow management device 100, in accordance with some examples of the disclosure. The direction of the flow can be seen from the velocity vectors and the first flow direction A, e.g., taken at the center of the flow through the inlet, and second flow direction B, e.g., taken at the center of the flow through the outlet, have been overlaid.

In some examples, a first angle between the first flow direction A and the second flow direction B may be between approximately 30 and 150 degrees, e.g., in a plane parallel with the second flow direction B and intersecting the first flow direction A where the flow enters the chamber 110. In some examples, the first angle may be greater than 90 degrees. In this way, the flow management device 100 can be utilized in situations where the required change in flow direction causes uneven flow in the second flow direction B, e.g., as a result of a sharp turn in the air flow path necessitated by packaging requirements of the vehicle. The flow management device 100 can provide a change in flow direction without uneven flow, e.g., separated or jetted flow, at the outlet 140.

In some examples, a cross-sectional area of the outlet 140 may be larger than a cross-sectional area of the inlet 130. Alternatively, in some examples, the cross-sectional area of the outlet 140 may be equal to the cross-sectional area of the inlet 130. In some examples, each of the inlet 130 and the outlet 140 may have a circular cross-section. Alternatively, in some examples, one or both of the inlet 130 and outlet 140 may have an elliptical, oval or polygonal cross-section.

The duct 120 has a first end 122 and a second end 124. The first end 122 is configured to receive the flow from the inlet 130. The second end 124 is configured to release the flow towards the outlet 140. In this way, the duct 120 can control the flow through the outer chamber 110 and reduce irregularities in the flow which is released towards the outlet 140.

A cross-sectional area of the duct 120 increases towards each of the first and second ends 122, 124 of the duct 120. For example, a point along an axial length of the duct 120 may have a smaller cross-sectional area than the first end 122 of the duct 120 and the second end 122 of the duct 120. In the example shown in FIGS. 1-5, the smallest cross section of the duct is provided at about 30% along the length of the duct 120, taken from the first end 122. However, the smallest cross section of the duct 120 may be provided at any appropriate point along the duct 120, e.g., half way along, etc. In this way, the duct 120 provides a flow constriction or "choke", whereby the flow is compressed and accelerated through a narrower portion of the duct 120 before being released towards the outlet 140. In this way, the flow management device 100 can reduce uneven flow in the second flow direction. The flow provided to the outlet 140 in the second flow direction can be more evenly distributed across the outlet 140.

In the example shown in FIGS. 1-5, the cross-sectional area at the first end 122 of the duct 120 may be less than the cross-sectional-area at the second end 124 of the duct 120. Alternatively, in some examples, the cross-sectional area at the first end 122 of the duct 120 may be equal to the cross-sectional-area at the second end of the duct 120

In some examples, the smallest cross-sectional area of the duct 120 may be substantially the same as a cross-sectional area of the inlet 130. For example, the smallest cross-sectional area of the duct 120 and the cross-sectional area of the inlet 130 may be equal within a margin of ±10%. By matching the smallest cross-sectional area of the duct 120 with the cross-sectional area of the inlet 130, the flow management device 100 can provide an improved regularity of flow in the second flow direction.

Figure 3:
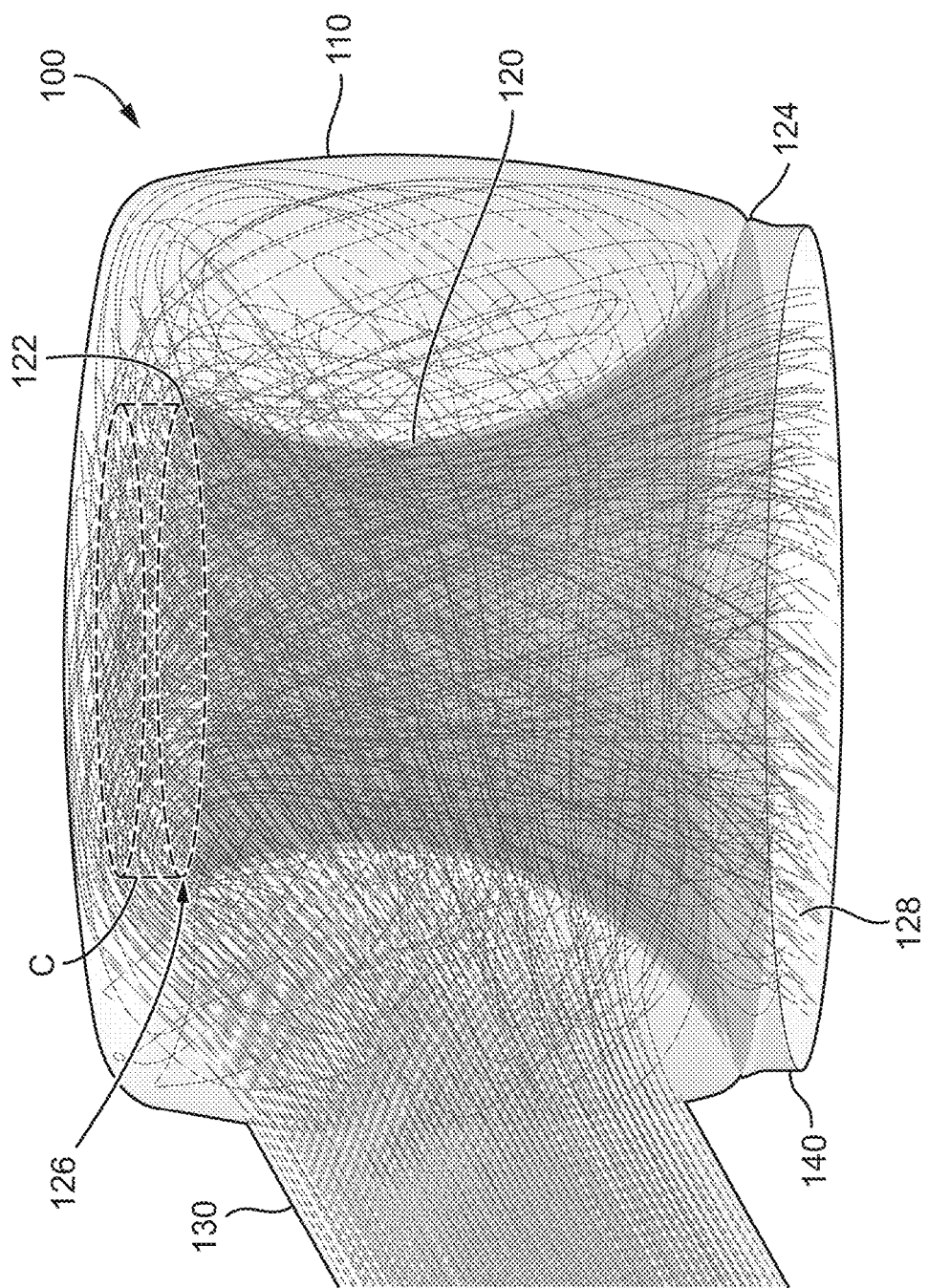
FIG. 3 illustrates an exemplary streamline view of a flow management device, in accordance with some examples of the disclosure.

FIG. 3 shows a streamline view of the flow management device 100, in accordance with some examples of the disclosure. As shown, the received flow can circulate around the outer chamber 110 before passing into the first end 122 of the duct 120. By first circulating around the outer chamber 110, irregularities in the flow can be reduced and a radial symmetry of the flow entering the first end 122 of the duct 120 can improved.

In some examples, a flow path bounded by the first end 122 of the duct 120 and an inner wall of the chamber 100 may have a minimum area which is substantially the same as a cross-sectional area of the inlet 130. For example, the minimum area and the cross-sectional area of the inlet 130 may be equal within a margin of ±10%. As shown in FIG. 3, a virtual surface C can be constructed which extends, e.g., axially away from, from an edge 126 defining the first end of the duct 120 to the nearest inner surface of the outer chamber 110. The virtual surface C may have an area which is substantially the same as a cross-sectional area of the inlet 130, e.g., the areas may be equal within a margin of ±10%. By matching the area of the flow path into the first end 122 of the duct 120 with the cross-sectional area of the inlet 130, the flow management device 100 can provide an improved regularity of flow in the second flow direction.

In some examples, an edge 128 defining the second end 124 of the duct 120 may be radially joined to an inner surface of the outer chamber 110. In this way, the received flow must pass into the first end of the duct 120 to reach the outlet 140. In the example shown in FIG. 3, the edge 128 is directly joined, e.g., circumferentially, to the inner surface of the outer chamber 110, such that no flow can pass directly from the inlet 130 to the outlet 140. However, in other examples, the an edge 128 defining the second end 124 of the duct 120 may be radially joined to an inner surface of the outer chamber 110 by one or more webs or tabs, such that one or more openings exist that allow some flow to pass directly from the inlet 130 to the outlet 140, e.g., without having passed through duct 120.

In some examples, the second end 124 of the duct 120 may be spaced apart, e.g., axially, from the outlet 140 of the chamber. In this way, the flow provided to the outlet 140 in the second flow direction can be can be more evenly distributed across the outlet 140.

Figure 4:
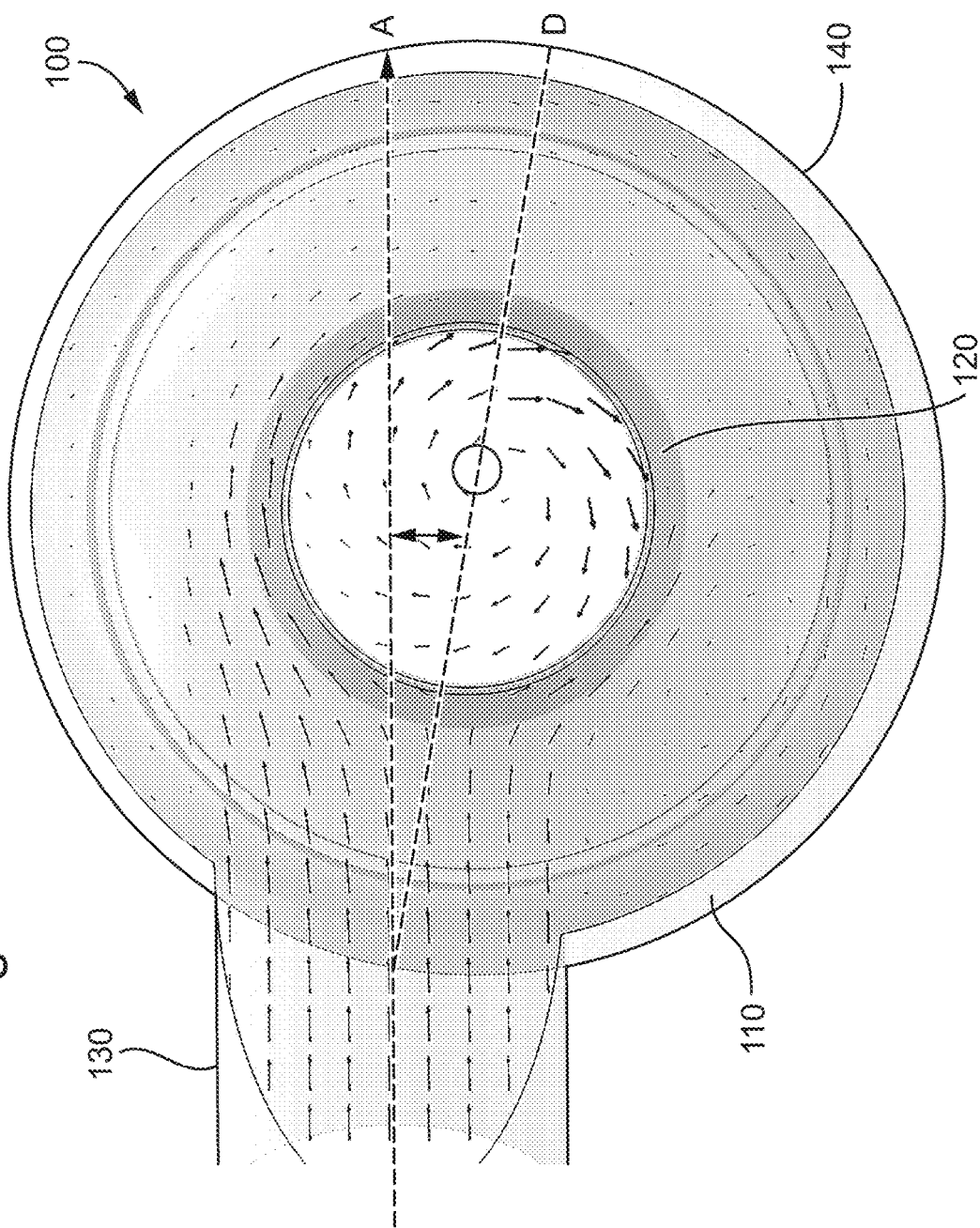
FIG. 4 illustrates an exemplary streamline view of a flow management device, in accordance with some examples of the disclosure.

FIG. 4 shows a streamline view of a flow management device 100, in accordance with some examples of the disclosure. The flow management device 100 is shown in plan view.

As shown, the duct 120 may be coaxial with the outer chamber 110. In this way, the received flow can circulate evenly around an outer surface of the duct 120. Alternatively, in some examples, the duct 120 may be arranged at an axially offset position within the outer chamber 110. In some examples, a central axis of the duct 120 may be angled with respect to a central axis of the outer chamber 110. In the example shown in FIG. 4, the center of the swirling flow lines is offset from the central axis of the duct 120. It is to be understood that the manner in which the flow management device 100 is parameterized, as described herein, influences the location of the center of swirl of the flow through the duct. Moreover, the offset between the center of swirl and the central axis of the duct can be dependent on the flow rate through the device 100. For example, the relative dimensions of the device maybe selected to provide a center of swirl that is substantially coincident with the central axis of the duct, when the flow rate through the duct is a median flow rate for a given application of the device 100.

In some examples, a second angle between the first flow direction A and a line D intersecting the inlet 130, e.g., at an inner wall of the chamber 110, and a central axis of the duct 120 (or a central axis of swirl) may be between 0 and 30 degrees. In some examples, the second angle may be less than 10 degrees, e.g., the second angle may be approximately 7 degrees. In this way, the received flow in the first flow direction A can be circulated around the outer chamber 110. The second angle is large enough to cause circulation of the received flow, but not large enough to cause a cyclone flow effect.

Figure 5:
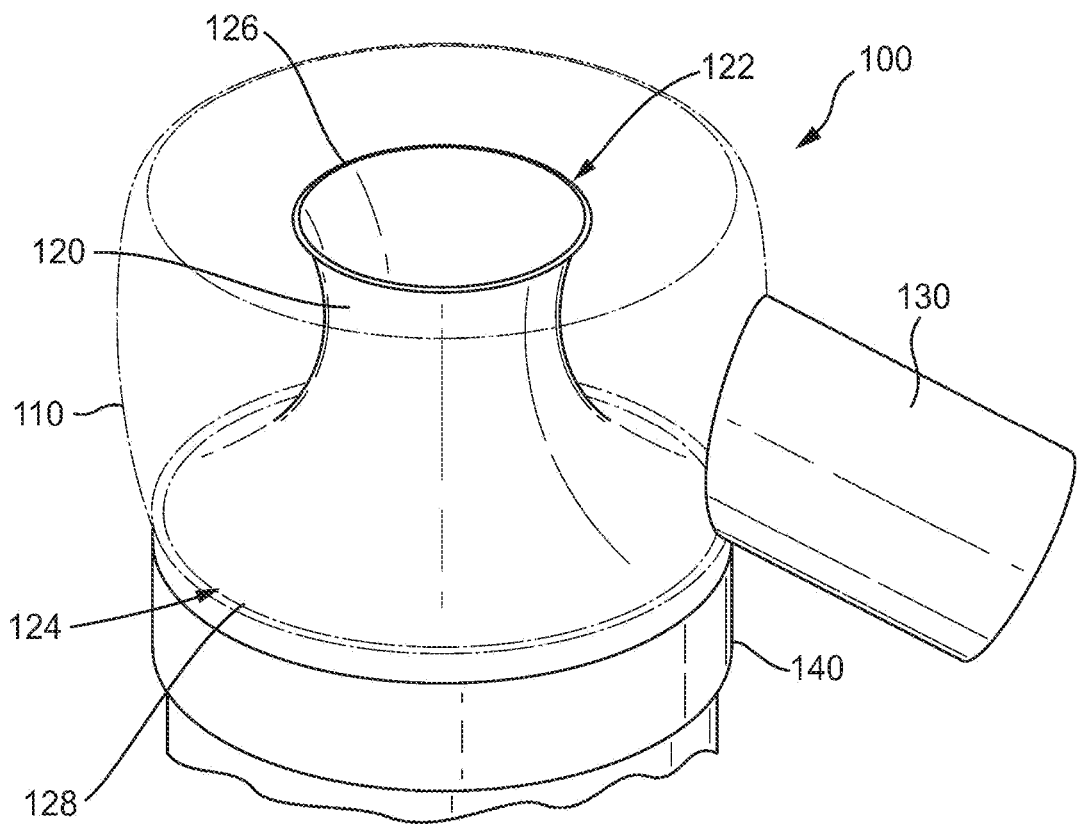
FIG. 5 illustrates an exemplary interior view of a flow management device, in accordance with some examples of the disclosure.

FIG. 5 shows an interior view of a flow management device 100, in accordance with some examples of the disclosure. In some examples, the duct 120 may be at least a partial hyperboloid. For example, the duct 120 may be symmetric around a central axis. A cross-section at each point on the duct 120 may be circular. Alternatively, in some examples, the duct 120 may include one or more points with an elliptical or oval cross-section.

In some examples, the first end 122 of the duct 120 and the second end 124 of the duct 120 may each have an opening in a plane which is perpendicular to a central axis of the duct 120. Alternatively, in some examples, the first and/or second end 122, 124 of the duct 120 may be in a plane angled with respect to a central axis of the duct 120. In some examples, the first and second end 122, 124 of the duct 120 may be angled with respect to the central axis of the duct 120, either at the same angle or different angles.

In some examples, the first end 122 of the duct 120 may be curved radially outwards and back towards the second end 124. In this way, noise caused by the passage of the flow across and into the first end of the duct 120 may be reduced.

In some examples, a secondary duct (not shown) may be arranged at least partially within the duct 120. For example, a secondary duct may be coaxially aligned with the duct 120 or may be axially offset and/or angled within the duct 120. The secondary duct may be formed with the same curvature as the duct 120, e.g., as a double wall or double skin. Alternatively, the secondary duct may have a different form or curvature to the duct 120. In some examples, one or more further ducts may be co-located with the duct 120, e.g., a total of three or more duct walls. By providing additional ducts, the flow management device 100 may provide more flow paths between the inlet 130 and outlet 140, which can reduce irregularities in the flow provided to the outlet 140.

In some examples, an interior and/or exterior of the duct 120 may include a plurality of fins (not shown). For example, a plurality of fins extending a least partially along the length of the duct 120 may be formed on an internal wall of the duct 120. In this way, the flow through the duct 120 can be guided and the flow provided to the outlet 140 can be made more regular.

In some examples, the duct 120 may include one or more perforations. In this way, a degree of mixing can be allowed between the flow circulating in the outer chamber 110 and the flow inside the duct 120. Such mixing can improve the even distribution of flow provided to the outlet 140.

In some examples, a secondary inlet may be arranged substantially opposite the first inlet 130 on the outer chamber 110. In this way, a secondary flow can be introduced into the flow management device 100, allowing flows from two different sources to be mixed. The flows may be the same liquid or gas or may be different, e.g., to mix two different reagents. By arranging the secondary inlet opposite the first inlet 130, the secondary flow can be introduced at a slow flowing point in the system. This can increase the residence time of the two flows and improve mixing. Alternatively, in some examples, a secondary inlet may be arranged substantially in line with the duct 120. In this way, the secondary flow can be introduced at a fast flowing point in the system, which can maximize mixing with a short residence time.

Figure 6:
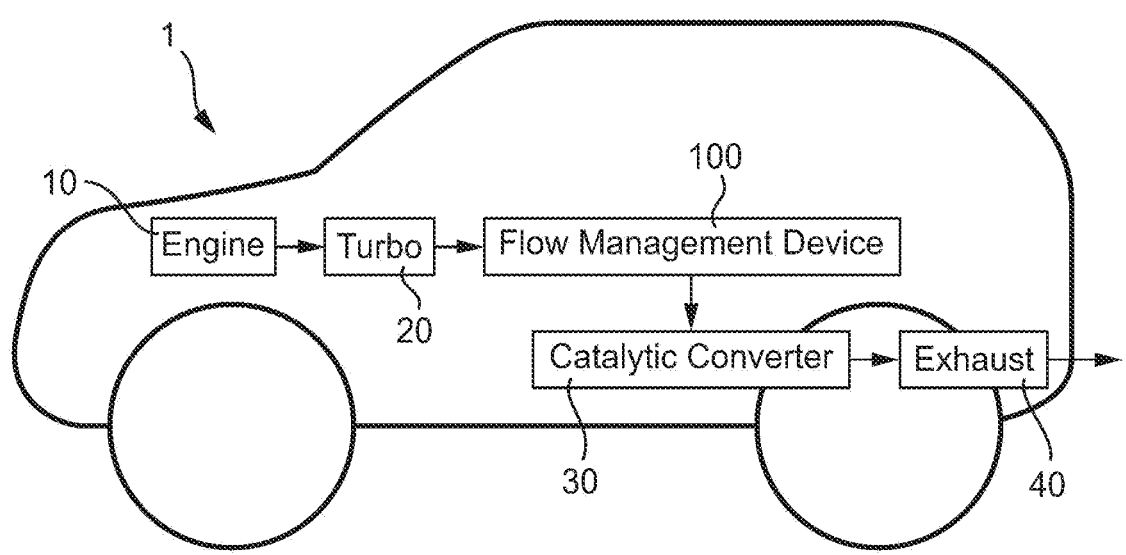
FIG. 6 illustrates an exemplary diagram of a vehicle comprising a flow management device, in accordance with some examples of the disclosure.

FIG. 6 shows a vehicle 1, in accordance with some examples of the disclosure. The vehicle 1 comprises the flow management device 100 of the example shown in FIG. 1.

The vehicle 1 comprises an engine 10, a turbocharger 20 (or "turbo"), the flow management device 100, a catalytic converter 30 and an exhaust 40. A flow of exhaust gas is produced by the engine 10. The components of the vehicle which receive the flow of exhaust gas may be referred to as an exhaust system. The exhaust system may include, the turbocharger 20, the flow management device 100, the catalytic converter 30 and the exhaust 40. Although not shown, the exhaust system may include an aftertreatment system and/or one or more exhaust gas recirculation loops. While the flow management device 100 is shown between turbo 20 and catalytic convertor 30, the flow management device 100 may be positioned in between any appropriate components of the exhaust system (or indeed between any components of an appropriate air or fluid flow system).

The flow of exhaust gas passes through and powers the turbocharger 20. The inlet 130 of the flow management device 100 is connected with the turbocharger 20. The inlet 130 receives the flow of exhaust gas from the turbocharger 20 in the first flow direction. The outlet 140 of the flow management device 100 is connected with the catalytic converter 30. The outlet 140 provides the flow of exhaust gas to the catalytic converter 30 in the second flow direction. The catalytic converter 30 passes the flow of exhaust gas to the exhaust 40 for ejection from the vehicle 1.

By changing the direction of the flow of exhaust gas, the flow management device 100 improves the packaging of the turbocharger 20 and catalytic converter 30. The turbocharger 20 and catalytic converter 30 can be arranged closer together when they do not need to be placed in-line. In addition, the flow management device 100 allows such an arrangement of the turbocharger 20 and catalytic converter 30 without causing an unevenly distributed flow in the catalytic converter 30. In this way, the flow management device 100 can improve the utilization and efficiency of the catalytic converter 30.

In other examples, the flow management device 100 of the example shown in FIGS. 1-5 can be used in any situation where a change in flow direction can improve the arrangement of a flow system and, in particular, where it is beneficial to ensure that the flow is uniform throughout the system. FIG. 7 shows a representation of a conventional "U-bend plus cone" arrangement 101 used to change flow direction in package-restricted applications compared to a "trumpet in a box" device 100 according to the present disclosure, as illustrated in FIGS. 1-5. FIGS. 8A-8C each show a comparison between a simulated velocity distribution for gaseous flow, taken at outlet conditions, for a conventional system (left hand side) and the system according to the present disclosure (right hand side) for various model sizes. In particular, FIG. 8A shows a base model size, FIG. 8B shows a 8× model size, and FIG. 8C shows a 0.5× model size. In the simulation, the base model size comprised an outlet diameter, e.g., the diameter of outlet 140, of 153 mm (which approximates the dimensions of a typical catalytic converter used in automotive applications). Specifically, FIGS. 8A-8D each show the how the uniformity of flow, e.g., variation in flow velocity, is improved at each size of the model assessed. It shows that, with exhaust gas for example, the flow management device 100 of the example shown in FIGS. 1-5 is very effective for the range of sizes (×0.5 to ×8) analyzed. For the conventional arrangement, the smaller the device the worse the uniformity, but for flow management device 100 uniformity is improved for every size assessed.

In some examples, the flow management device 100 may be implemented in a system comprising liquid flow, such as water. FIG. 9 shows how the extent of the uniformity index improvement (Gamma) for gas flow and liquid flow over a multiple sized models. Clearly with gas flow the improvement is significant (70-80% improvement in the uniformity index) for the whole range of device sizes. For water flow there is also an improvement, but less significant and more variable over the device size range. Nonetheless, FIG. 9 illustrates that implementation of the flow management device 100 disclosed herein is not limited to gas flow. Indeed, the flow management device 100 may be implemented in any appropriate scenario, e.g., in plant design, where an increase in flow uniformity is desired, especially where package requirements impose a sharp change in direction of flow.

This disclosure is made for the purpose of illustrating the general principles of the systems and processes discussed above and are intended to be illustrative rather than limiting. More generally, the above description is meant to be exemplary and not limiting and the scope of the disclosure is best determined by reference to the appended claims. In other words, only the claims that follow are meant to set bounds as to what the present disclosure includes.

While the present disclosure is described with reference to particular example applications, it will be appreciated that the disclosure is not limited hereto and that particular combinations of the various features described and defined in any aspects can be implemented and/or supplied and/or used independently. It will be apparent to those skilled in the art that various modifications and improvements may be made without departing from the scope and spirit of the present disclosure. Those skilled in the art would appreciate that the actions of the processes discussed herein may be omitted, modified, combined, and/or rearranged, and any additional actions may be performed without departing from the scope of the disclosure.

Any system features as described herein may also be provided as a method feature and vice versa. As used herein, means plus function features may be expressed alternatively in terms of their corresponding structure. It shall be further appreciated that the systems and/or methods described above may be applied to, or used in accordance with, other systems and/or methods.

Any feature in one aspect may be applied to other aspects, in any appropriate combination. In particular, method aspects may be applied to system aspects, and vice versa. Furthermore, any, some and/or all features in one aspect can be applied to any, some and/or all features in any other aspect, in any appropriate combination.

What is claimed is:

1. A flow management device comprising:
   an outer chamber comprising:
      an inlet arranged to receive a flow in a first flow direction; and
      an outlet arranged to provide the flow in a second flow direction different from the first direction; and
   a duct arranged within the outer chamber, the duct having a first end configured to receive the flow from the inlet and a second end configured to release the flow towards the outlet, wherein a cross-sectional area of the duct increases towards each of the first and second ends of the duct, wherein the smallest cross-sectional area of the duct is substantially the same as a cross-sectional area of the inlet.

2. The flow management device of claim 1, wherein an edge defining the second end of the duct is radially joined to an inner surface of the outer chamber.

3. The flow management device of claim 1, wherein a first angle between the first flow direction and the second flow direction is greater than 90 degrees.

4. The flow management device of claim 1, wherein a second angle between the first flow direction and a line intersecting the inlet and a central axis of the duct is between 0 and 30 degrees.

5. The flow management device of claim 1, wherein a flow path bounded by the first end of the duct and an inner wall of the outer chamber has a minimum area which is substantially the same as a cross-sectional area of the inlet.

6. The flow management device of claim 1, wherein the duct is at least a partial hyperboloid.

7. The flow management device of claim 1, wherein the second end of the duct is spaced apart from the outlet of the outer chamber.

8. The flow management device of claim 1, wherein the outer chamber is substantially cylindrical.

9. The flow management device of claim 1, wherein the duct is coaxial with the outer chamber.

10. The flow management device of claim 1, wherein a cross-sectional area of the outlet is larger than a cross-sectional area of the inlet.

11. The flow management device of claim 1, wherein the first end of the duct is curved outwards and back towards the second end.

12. The flow management device of claim 1, wherein the first end of the duct is angled with respect to a central axis of the duct.

13. A forced air induction system for a vehicle, comprising:
   a turbocharger;
   a flow management device comprising:
      an outer chamber comprising:
         an inlet arranged to receive a flow in a first flow direction; and
         an outlet arranged to provide the flow in a second flow direction different from the first direction; and
      a duct arranged within the outer chamber, the duct having a first end configured to receive the flow from the inlet and a second end configured to release the flow towards the outlet, wherein a cross-sectional area of the duct increases towards each of the first and second ends of the duct, wherein the inlet is connected with an outlet of the turbocharger; and
   a catalytic converter, wherein an inlet of the catalytic converter is connected with the outlet of the flow management device.

14. A vehicle comprising the forced air induction system of claim 13.

15. A flow management device comprising:
   an outer chamber comprising:
      an inlet arranged to receive a flow in a first flow direction; and
      an outlet arranged to provide the flow in a second flow direction different from the first direction; and
   a duct arranged within the outer chamber, the duct having a first end configured to receive the flow from the inlet and a second end configured to release the flow towards the outlet, wherein a cross-sectional area of the duct increases towards each of the first and second ends of the duct, wherein a cross-sectional area at the first end of the duct is less than a cross-sectional-area at the second end of the duct.

* * * * *